(12) United States Patent
Jackson et al.

(10) Patent No.: US 11,598,884 B2
(45) Date of Patent: Mar. 7, 2023

(54) METHOD AND APPARATUS FOR SATELLITE-BASED NAVIGATION AUGMENTED WITH ALTERNATIVE POSITION AND TIMING DATA

(71) Applicant: Viavi Solutions, Inc., Chandler, AZ (US)

(72) Inventors: Gregor Said Jackson, Las Vegas, NV (US); Giovanni D'andrea, Las Vegas, NV (US)

(73) Assignee: Viavi Solutions, Inc., Chandler, AZ (US)

( * ) Notice: Subject to any disclaimer, the term of this patent is extended or adjusted under 35 U.S.C. 154(b) by 0 days.

(21) Appl. No.: 17/542,172

(22) Filed: Dec. 3, 2021

(65) Prior Publication Data

US 2022/0163678 A1 May 26, 2022

Related U.S. Application Data

(63) Continuation of application No. 16/990,956, filed on Aug. 11, 2020, now Pat. No. 11,194,055, which is a continuation of application No. 15/429,156, filed on Feb. 9, 2017, now Pat. No. 10,809,384.

(51) Int. Cl.
*G01S 19/36* (2010.01)
*G01S 19/32* (2010.01)
*G01S 19/42* (2010.01)
*G01S 19/23* (2010.01)

(52) U.S. Cl.
CPC .............. *G01S 19/36* (2013.01); *G01S 19/23* (2013.01); *G01S 19/32* (2013.01); *G01S 19/426* (2013.01)

(58) Field of Classification Search
CPC .......... G01S 19/36; G01S 19/23; G01S 19/32; G01S 19/426
See application file for complete search history.

(56) References Cited

U.S. PATENT DOCUMENTS 5,594,454 A * 1/1997 Devereux ............... G01S 19/36
342/357.395
2015/0247929 A1* 9/2015 Shimomaki ............... G01S 7/40
342/357.4

* cited by examiner

*Primary Examiner* — Marc Anthony Armand
(74) *Attorney, Agent, or Firm* — Farjami & Farjami LLP

(57) ABSTRACT

A navigational apparatus and method for augmenting a GNSS signal to the GPS simulator with alternative position, navigation, or timing (PNT) data, wherein the GPS simulator encodes an RF-simulated GPS signal based on the alternative PNT data when the GNSS signal is not available or is denied. The alternative PNT data may be provided by one or more of an Inertial Measurement Unit, Inertial Navigation System (IMU/INS) module and oscillator coupled to the GPS simulator.

20 Claims, 3 Drawing Sheets

METHOD AND APPARATUS FOR SATELLITE-BASED NAVIGATION AUGMENTED WITH ALTERNATIVE POSITION AND TIMING DATA

CROSS-REFERENCE TO RELATED APPLICATIONS

The present application is a continuation of U.S. patent application Ser. No. 16/990,956, filed Aug. 11, 2020, now U.S. Pat. No. 11,194,055, which is a continuation of U.S. patent application Ser. No. 15/429,156, filed Feb. 9, 2017, now U.S. Pat. No. 10,809,384, the disclosures of which are hereby incorporated by reference in their entireties.

BACKGROUND

The present invention relates to the retrofitting Global Positioning System (GPS) receivers, and in particular, to a method and apparatus to retrofit GPS receivers and other global navigation satellite system (GNSS) receivers.

New satellite systems are emerging. Many systems and vehicles have hardware and firmware which may be rendered useless by the changing system requirements and compatibility. Therefore, there is a need for method and apparatus to retrofit GPS receivers and other GNSS receivers.

SUMMARY

Embodiments of the present invention include an interface apparatus for retrofitting a GNSS apparatus. The interface apparatus comprises an antenna configured to receive a GNSS signal, an amplifier coupled to the antenna to receive and amplify the GNSS signal, a GPS receiver coupled to the amplifier to receive the GNSS signal, and a GPS simulator providing a second GPS signal. The GPS receiver transforms the GNSS signal into a Pulse Per Second (PPS) signal and a Position Velocity and Time/Position Navigation and Time (PVT/PNT) signal and the simulator generates a simulation signal from the PPS signal and the PVT/PVN signal.

In one embodiment the interface apparatus further includes a power controller capacitively coupled to the GPS simulator and a legacy receiver. The GPS simulator provides the GPS signal and the power controller receives power from the legacy receiver over a single conductor.

In yet another embodiment the power controller operates periodically to draw a charge from the legacy receiver. The charge is used to charge a battery for supplying current to the GPS receiver during on times.

Embodiments of the present invention include a method. The method comprises receiving a GNSS signal, amplifying the GNSS signal, transforming the GNSS signal into a PPS signal and a PVT/PNT signal, and simulating a GPS signal from the PPS signal and the PVT/PNT signal.

In one embodiment the interface apparatus further includes attenuating a L1 C/A signal to be compatible with an L1 C/A antenna input, wherein said GPS signal includes said L1 C/A signal.

DETAILED DESCRIPTION

Described herein are techniques for method and apparatus to retrofit GPS receivers and other GNSS receivers. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
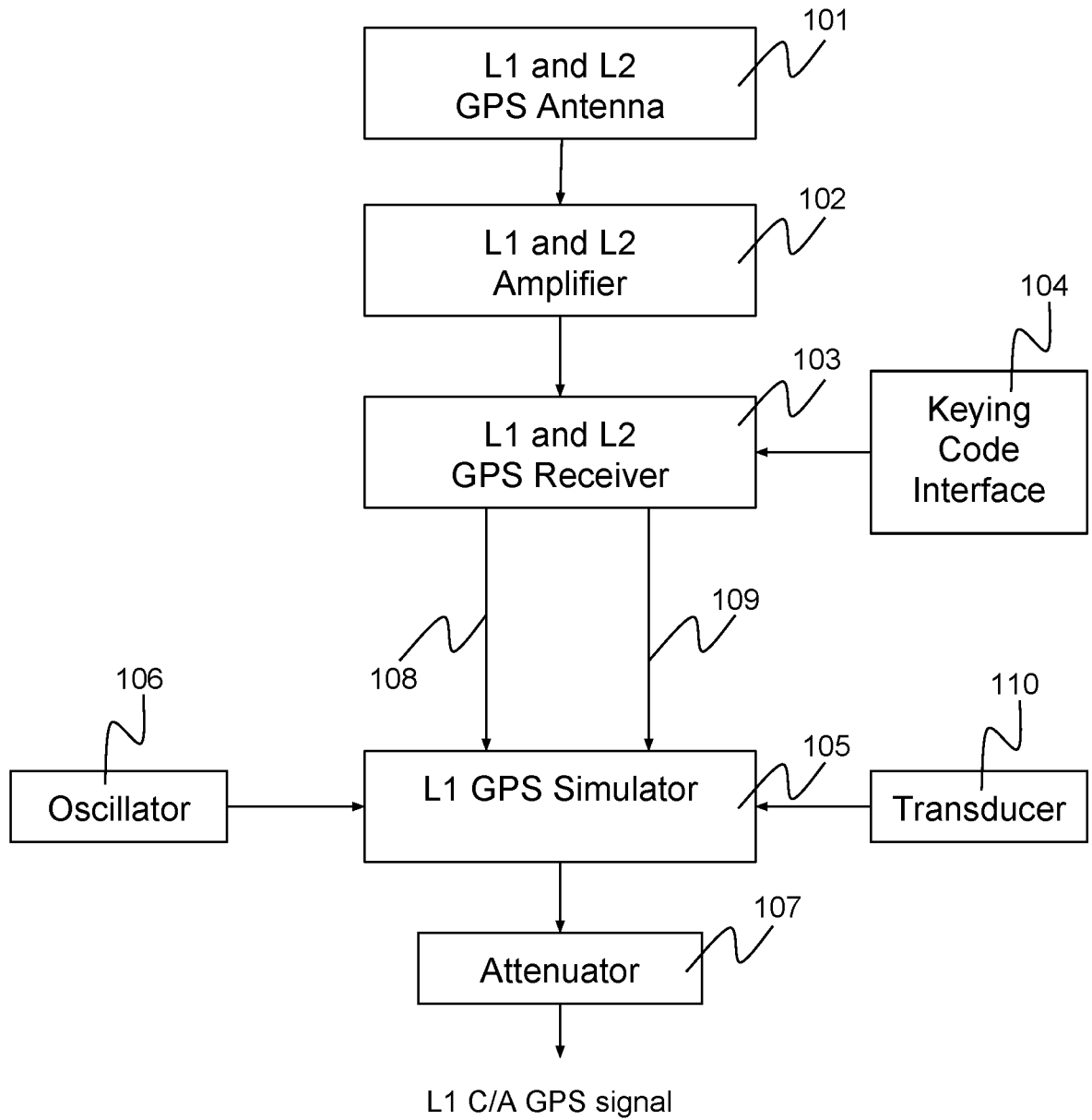
FIG. 1 illustrates an apparatus to retrofit a GNSS receiver according to one embodiment of the present invention.

FIG. 1 illustrates an apparatus 100 to retrofit a GNSS receiver (not shown) according to one embodiment of the present invention. Apparatus 100 includes antenna 101, amplifier 102, receiver 103, interface 104, simulator 105, oscillator 106, and attenuator 107. Receiver 100 may be used to retrofit an existing legacy GPS system to translate L1 and L2 military signals into a simulated L1 commercial signal that the legacy GPS receiver may process. The translation of L1 or L2 may be in response to available secret keying information provided at interface 104.

Apparatus 100 receives a signal at antenna 101. Antenna 101 may receive encrypted P(Y) military code having carrier frequencies L1 and L2. Amplifier 102 is coupled to receive L1 and L2 GPS signals from antenna 101. Receiver 103 is coupled to receive the amplified L1 and L2 GPS signals from amplifier 102. Receiver 103 produces a one pulse per second (1 PPS) signal at output 108 and a position-velocity-timing and/or position-navigation-timing (PVT/PNT) signal at output 109 from either L1 or L2. Interface 104 accepts keying code information that controls whether L2 GPS signals are processed. The default may be that only L1 signals are processed when the keying code is absent. Simulator 105 receives the 1 PPS and PVT/PNT signals and outputs a simulated (transcoded) L1 GPS signal. Attenuator 107 is coupled to receive the simulated L1 GPS signal from simulator 105 and attenuate the signal enough so that a legacy GPS receiver (not shown) processes the signal as a normal L1 C/A GPS signal.

Oscillator 106 may be used to generate a calculated timing when the L1 and L2 signal are not available or denied. Oscillator 106 may also be used in inertial navigation systems as described below. Transducer 110 is coupled to simulator 105 to provide alternate input regarding speed, position, and/or direction. Transducer (sensor) 110 may be a gyro, a magnetometer, an accelerometer, celestial sensor, geo-mapping sensor, 3D RADAR sensor, EO/IR, or any collection of transducers. Transducer 110 may be used to provide inertial navigation. Transducer 110 may be used in conjunction with oscillator 106.

Figure 2:
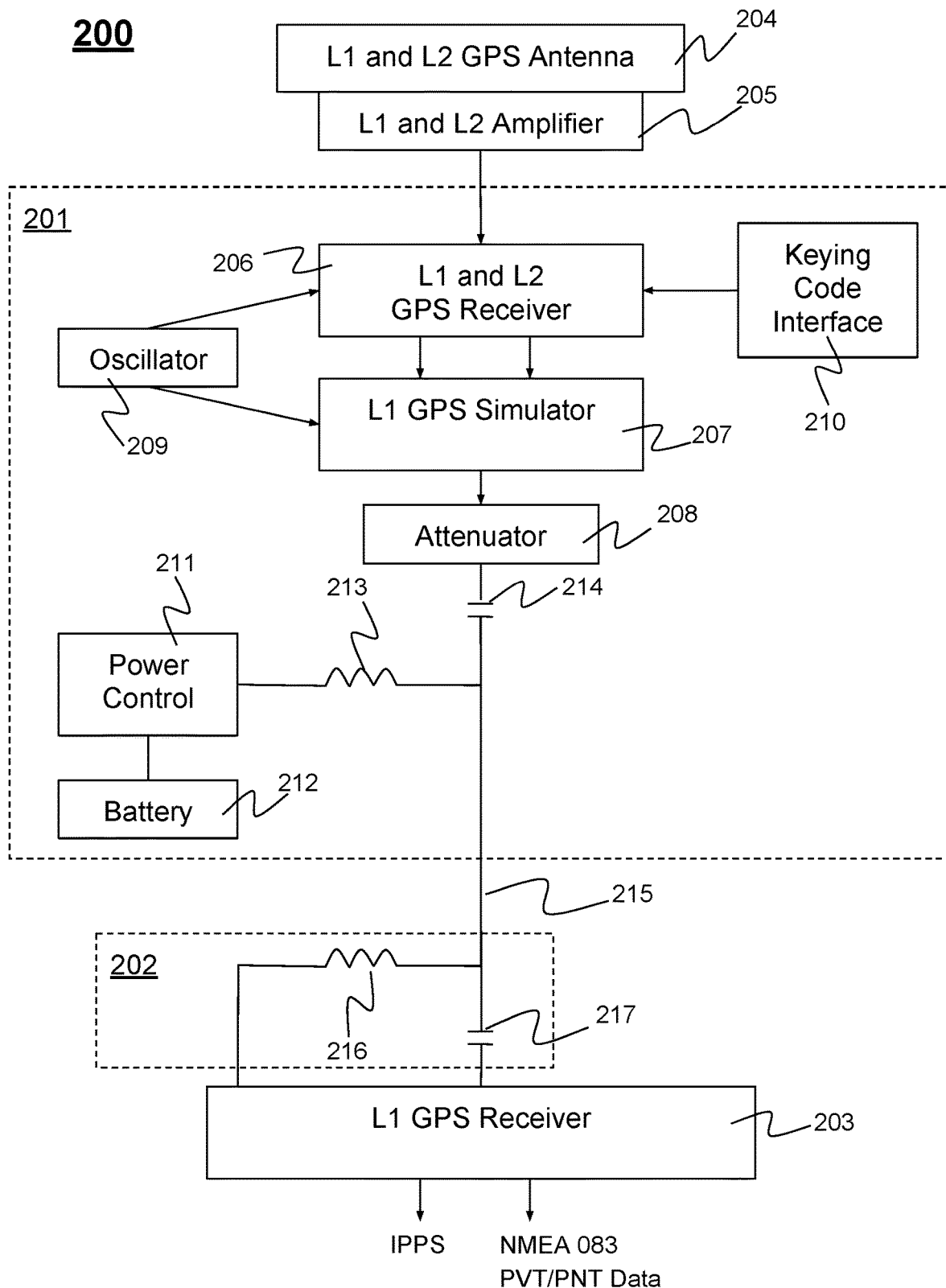
FIG. 2 illustrates a module to retrofit a GNSS receiver according to another embodiment of the present invention.

FIG. 2 illustrates a module 201 to retrofit a GNSS receiver 203 according to another embodiment of the present invention. In this embodiment, module 201 may be entirely powered by the legacy GPS receiver (i.e. GNSS receiver 203) industry-standard power-feed designed to drive the original C/A L1 antenna amplifier. This may alleviate the need for external power sources in the retrofit. Antenna 204 is coupled to amplifier 206 to provide L1 and L2 signals to module 201. Module 201 includes GPS receiver 206, simulator 207, interface 210, and attenuator 208 which operated similar to receiver 103, simulator 105, interface 104, and attenuator 107 of FIG. 1. Oscillator 209 couples to both receiver 206 and simulator 207 in this embodiment. Oscillator 209 may be a high-stability oscillator like a Chip Scale Atomic Clock (CSAC) and improve holdover performance of direct-Y code acquisition which is very important for the SAASM military GPS receiver. This may speed-up GPS re-acquisition after coming out of a tunnel, for example, and will aid the inertial navigation functions.

A simulated signal couples to L1 GPS receiver 203 through blocking capacitor 214, coaxial feed 215, and blocking capacitor 217. Radio frequency (RF) blocking inductor 216 provides power to coaxial feed 215, and RF blocking inductor 213 passes power to power control 211. Power control provides power to charge up battery 212 and provide power to module 201. Module 201 may operate periodically such that the battery may be recharged during off times and ample operating current may be supplied during on times. This duty cycle of operation is described in further detail below.

Figure 3:
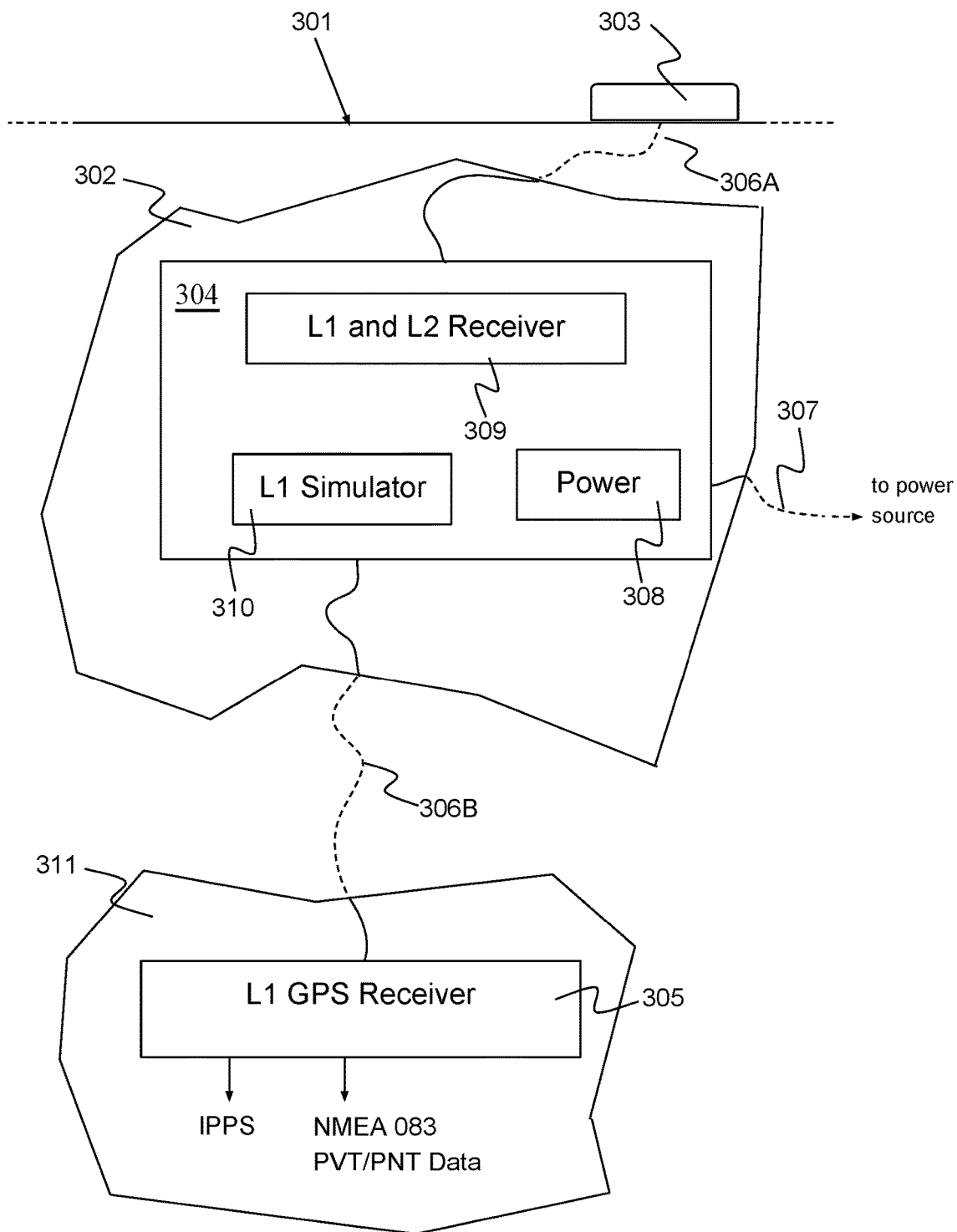
FIG. 3 illustrates a retrofitted GNSS system according to yet another embodiment of the present invention.

FIG. 3 illustrates a retrofitted system 300 according to yet another embodiment of the present invention. Retrofitted system 300 is an aircraft system. The retrofit portion of the system is illustrated through cutout 302, and the legacy portion is illustrated through cutout 311. Retrofitted system 300 includes aircraft fuselage 301 and a module 304 spliced between legacy antenna 303 and legacy GPS receiver 305. The legacy cable feed was cut and module 304 is coupled between cable portion 306A and 306B. Module 304 includes an L1 and L2 receiver 309, an L1 simulator 310 and power control 308. Power control 308 is coupled to a power source through cable 307. An external SAASM keying device may also connect to Module 304 to download secret decoding keys to the device.

Embodiments of the present invention include antenna systems that replace the legacy GNSS antenna with a similarly-sized GNSS transcoder as described below. This transcoder in one embodiment is comprised of a receiver section and a simulator/transcoder section that would receive the desired GNSS system using the GNSS receiver, decode the GNSS signals into Position, Velocity, and Timing (PVT) data (also called PNT for Position, Navigation, and Timing data), then re-encode this PVT/PNT data into a legacy format in real-time using GNSS simulator technology. This simulated secondary GNSS signal would then be fed to the legacy equipment GNSS receiver via its legacy antenna cable, and this legacy receiver would then decode the simulated legacy GNSS signal and generate PVT/PNT data as if it had received the same information directly from the legacy GNSS satellite antenna.

This embodiment may, for example, receive the military L2 GPS carrier frequency using a secret P(Y) coding scheme, decode said P(Y) code into raw PVT/PNT data (typically transmitted in the industry in the NMEA or ICD-GPS-153 serial data format alongside 1 Pulse Per Second (1 PPS) time-mark), then re-encode in real-time said PVT/PNT data-stream into a commercial L1 C/A code GPS signal that can be decoded by any GPS receiver in the world, such as those used on all US military vehicles, Man-Pack radios, car-navigation systems, Smart Phones, GPS Navigators, GPS timing receivers, etc. Field personnel may retrofit this transcoder to the legacy equipment's GPS antenna input quickly and with minimal change in the existing legacy GPS system. This may allow for retrofitting any commercial L1 C/A compatible GPS receiver to be able to receive the western-military standard L1/L2 P(Y) code. This retrofitting may include only replacing the legacy GPS antenna with this transcoder embedded into a replacement GPS antenna to the legacy GPS receiver. This transcoder may also be configured to be inserted between the legacy GPS antenna, and the GPS receiver, thereby re-using the previously installed GPS antenna. This may allow for decoding the signals that may be previously unable to be decoded by the legacy GPS receiver (e.g. the P(Y) code in place of the C/A code, or Pseudolite signals according to specification IS-GPS-250A to be converted to standard C/A code).

GNSS antennae typically include an internal signal amplifier. This amplifier is usually powered by a DC-power voltage which is super-imposed upon the antenna RF signal, and typically provides between 3.0V to 5V, or even up to 12V DC to the GNSS antenna. In another embodiment of present invention, this antenna power may be used to power a module as described in FIG. 3. Such a module may be integrated by replacing the legacy GNSS antenna with the transcoder GNSS antenna system. In this case, the transcoder may only have a single wire connection to the legacy GNSS receiver through the antenna feed wire. The transcoder may send a transcoded legacy GNSS signal to the legacy GNSS receiver, and receive its operating power from the legacy GNSS receiver.

Other embodiments of the invention may consume more power than the legacy GNSS receiver is capable of transmitting via its GNSS antenna cable. For example, a typical commercial GPS receiver may only be able to provide 60 mA at 5V to the GNSS antenna (equaling a power of 0.3 Watt maximum that can be provided), but the transcoder module may consume 1.5 Watts operating power. In this case, the transcoder module may operate only periodically, and go to a sleep mode with very little power consumption (e.g. 0.01 Watts) most of the time. During the sleep periods, the transcoder module may store the 5V 60 mA power from the legacy GNSS receiver in a battery system by charging a battery. With a duty cycle of say 1-to-9, the transcoder module would be in a sleep state 90% of the time, and thus be able to charge the battery 90% of the operating time. The transcoder module may therefore operate for say 6 minutes of every hour, and, while sleeping, charge the transcoder module internal battery the remaining 54 minutes of every hour. This system on time would be equivalent to a vehicle with this system driving through a tunnel for 54 minutes of every hour (no GNSS reception) while providing a GNSS PVT/PNT solution for 6 minutes of every hour. This type of transcoder module power management may make retrofitting vehicles possible with current technology (i.e. power consumption capability) for currently deployed vehicles with legacy GNSS devices. As technology evolves, the power consumption and thus the required duty cycle of the transcoder module may be reduced to zero and therefore provide enough power to operate continuously. Other embodiments of this invention may receive operating power from other sources such as vehicle power supplies, batteries, solar cells, or any other form of power, allowing it to operate continuously and without drawing any power from the legacy GNSS receiver.

Power management of this transcoder module may also create a simulated antenna load to be compatible to legacy GNSS antenna systems. For example, the mass-produced DAGR and PLUGR SAASM handheld military GPS receivers measure and expect a certain current draw from the attached GPS antenna, and would not operate properly if the current draw is either too high or too low.

In yet another embodiment of this invention, a transcode module may transcode PVT/PNT information between differing GNSS systems. For example, a Glonass to GPS embodiment of this invention could receive Glonass signals and transcode and transmit these in GPS-format to a GPS receiver. This could be useful to allow sales of legacy GPS-only equipment inside Russia where presently Glonass capability is also required, and GPS-only equipment cannot be sold. Glonass also has certain advantages at the earths' poles where GPS reception is not possible (due to differences in the satellites' ephemeris) and may thus be used to navigate close to the poles such as in Alaska with legacy GPS equipment. Other embodiments of this invention could be used to transcode any GNSS system to any other GNSS system, such as BeiDou to Glonass, QZSS to GPS, Galileo to GPS, Pseudolite IS-GPS-250A to GPS, etc etc.

In another embodiment of this present invention, a transcode module may use external or internal GNSS simulators that receive PVT/PNT reference signals from various other sources such as vehicle wheel-sensor systems, or legacy inertial navigation systems, or GNSS Pseudo-lites or other geo-referencing systems that would be transcoded to legacy GNSS signals by an embodiment of this present invention, and thus obfuscate to the legacy GNSS receiver the true source of the PVT/PNT information.

In another embodiment of this present invention, a transcode module may use other forms of PVT/PNT encoding such as IRIG-B, Have Quick, or any other used PVT/PNT type of signal rather than NMEA or ICD-GPS-153 standardized formatted PVT/PNT information.

In embodiments of this present invention, a transcode module may add inertial navigation capability using gyros, magnetometers, and accelerometers (inside an Inertial Measurement Unit, Inertial Navigation System, IMU/INS) that would allow generating a calculated position and heading fix even if the GNSS signals are denied or not existent (while driving through a tunnel, for example, or if there are any type of GNSS signal jammers in the vicinity), and thus the legacy GNSS receiver would continue to generate a PVT/PNT fix as if it had good satellite reception even without any true satellites being received. This improved PVT/PNT signal may be transmitted to the legacy GNSS receiver via the built-in or externally-attached GNSS simulator. This INS would also allow up-converting the periodic PVT/PNT data that usually is generated in 1 Hz intervals to higher intervals such as 10 Hz or 100 Hz which will aid in the legacy GPS receiver to track the GNSS simulator more smoothly.

In another embodiment of the present invention, a transcode module may add a high-stability oscillator using chip-scale-atomic-clocks (CSACs) or high-stability ovenized oscillators (OCXOs) that would allow generating a calculated timing fix even if the GNSS signals are denied or not existent (while driving through a tunnel for example), and thus the legacy GNSS receiver would continue to generate a timing fix as if it had good satellite reception even without any true satellites being received. This improved PVT/PNT signal may be transmitted to the legacy GNSS receiver via the built-in or externally-attached GNSS simulator.

In yet another embodiment of the present invention, a transcode module may combine high-stability CSAC or OCXO oscillator capability with Inertial Navigation systems, to increase PVT/PNT accuracy during GNSS-denied operation. This improved PVT/PNT signal may be transmitted to the legacy GNSS receiver via the built-in or externally-attached GNSS simulator.

In yet another embodiment of the present invention, a transcode module may combine high-stability CSAC or OCXO oscillator capability with Inertial Navigation systems and with peer-to-peer navigation using other well-documented methods of navigation such as visual decoding of camera images, geo-location using time-difference-of-arrival (TDOA) or frequency-difference-of-arrival (FDOA) methods to increase PVT/PNT accuracy during GNSS-denied operation. These types of implementations may also follow the new IS-GPS-250A Pseudolite signal specification. This improved PVT/PNT signal could then be transmitted to the legacy GNSS receiver via the built-in or externally-attached GNSS simulator.

In yet another embodiment of the present invention, a transcode module may use a SAASM GPS receiver with the new military M-Code decoding capability rather than only P(Y) code, and re-transmit in C/A code.

In one embodiment of the present invention, a transcode module may use a SAASM GPS receiver with the new military M-Code decoding capability, and re-transmit in legacy military P(Y) code for retrofitting legacy military GPS receivers to the latest GPS military coding standards.

In yet another embodiment of the present invention, a transcode module may directly use the received satellites' information such as the Doppler shift, carrier-phase shifts, relativistic effects, Almanac, Ephemeris, and other information directly when re-transmitting the PVT/PNT information, and may communicate between the integrated GNSS receiver and GNSS simulator/transmitter via raw digital data rather than first decoding and translating the received information into NMEA or ICD-153 PVT/PNT data. In one embodiment of this present invention such raw satellite data may simply be re-encoded from P(Y) code to C/A code, and all of the carrier frequency/phase information be used directly to generate this new C/A code. This type of implementation may require less processing power, circuitry, time-delay, and may thus offers a lower cost solution to previously described embodiments of present invention.

In one embodiment a transcode module may transcode a single GNSS system to multiple GNSS systems. For example, Galileo signals, when they become available, may have much higher positioning and timing accuracy than GPS or Glonass signals. Galileo signals may be transcoded into two GNSS signals for example GPS and SBAS (WAAS/MSAS/EGNOS) which would improve the PVT/PNT accuracy of the legacy GPS receiver to bring this closer to the higher accuracies achievable with Galileo. Alternately, the Galileo signal may be encoded by the GNSS simulator into simultaneous GPS/GLONASS/BeiDou/QZSS/SBAS signals for maximum accuracy and flexibility, or into any other combination of the latter GNSS systems, encoding more than one single GNSS signal.

In another embodiment, a transcode module may use an amplifier after the GNSS simulator to power a GNSS transmitting antenna to create a local GNSS field of operation that allows wireless access to the GNSS simulator output signal. This transcode module may re-transmit the PVT/PNT signals and also transcode them into other carrier frequencies and coding schemes. This transcode module may be used for open-air applications if the apparatus changes the carrier frequency so that the re-transmitting antenna does not have the same carrier frequency of the receiving antenna to avoid feedback and cross-talk. All legacy GNSS receivers within this reception field of operation would track the simulator output signal because its signal strength would over-power the true sat signal levels. This is called GPS spoofing or GPS jamming if done maliciously. This could be used benevolently in a scenario where one high quality military GNSS receiver using say the L2 frequency encodes the PVT/PNT into a commercial C/A L1 code that any GPS receivers in the vicinity of the apparatus could receive, and synchronize to. This may be useful in a small platoon situation, for example, where the exact position of every soldiers is not necessarily required, but all soldiers' legacy GNSS receivers should be time and position synchronized to one single receiver. This may increase time-accuracy transmission between soldiers, and at the same time reduce costs by only requiring a single expensive military receiver that all soldiers in the platoon can share.

In one embodiment, a method includes generating an L1 C/A GPS signal having asynchronous data and immediately passing this signal to a receiving stage without electromagnetic propagation.

In another embodiment, a first receiver draws periodic power from a second receiver. The power is sourced from the signal input of the second receiver to the signal output of the first receiver. The first receiver is coupled to a first battery, and the second receiver is coupled to a second battery. A periodic switching regulator may be used to implement the charging of the first battery from the second battery.

In yet another embodiment, that the antenna, antenna amplifier, SAW Filter and the GPS receiver is situated inside an external module to provide a PVT signal (NMEA, IS-GPS-153 format, etc.). An interface apparatus may include electronics to receive the PVT signal and transcode the PVT signal into an RF (radio frequency) signal using real-time simulation. The RF signal may feed directly into the antenna input of the legacy receiver. In this embodiment, the interface apparatus may attach to the bottom of an integrated GPS antenna/receiver (L1 and L2 Military SAASM GPS) that is commercially available. A number of military radios and jammers that can only receive L1 C/A commercial GPS code may be retrofitted with this interface apparatus and enable the legacy equipment to continue to be utilized in the field.

The above description illustrates various embodiments of the present invention along with examples of how aspects of the present invention may be implemented. The above examples and embodiments should not be deemed to be the only embodiments, and are presented to illustrate the flexibility and advantages of the present invention. Based on the above disclosure, other arrangements, embodiments, implementations and equivalents will be evident to those skilled in the art and may be employed without departing from the spirit and scope of the invention.

What is claimed is:

1. A system comprising:
  a receiver configured to operate in conjunction with a global navigation satellite system (GNSS), the receiver capable of processing a signal received from that system and to output an indication of the position or the current time of the receiver based on the signal;
  means for providing position, navigation and time (PNT) data indicative of at least one of a position or a current time, the PNT data generated independent of the GNSS; and
  a simulator configured to perform the following acts in response to receiving the PNT data from the means for providing PNT data:
    generating a simulated GNSS signal, the simulated GNSS signal conforming to a signal of the GNSS that the receiver is capable of processing; and,
    outputting the simulated GNSS signal to the receiver, wherein responsive to receiving the simulated GNSS signal, the receiver outputs an indication of the position or the current time indicated in the PNT data.

2. The system of claim 1 wherein the GNSS is selected from the group consisting of GPS, Glonass, BeiDou, QZSS, and Galileo.

3. The system of claim 1 wherein the receiver is a first receiver configured to operate in conjunction with a first GNSS, and wherein the means for providing PNT data comprises a second receiver.

4. The system of claim 1 wherein the receiver is connected to the means for providing PNT data.

5. The system of claim 1 wherein the means for providing PNT data is an inertial measurement unit or inertial navigation system.

6. The system of claim 5 wherein the means for providing PNT data is an inertial navigation system comprising a component selected from the group consisting of gyros, magnetometers, and accelerometers.

7. The system of claim 1 wherein the means for providing PNT data is selected from the group consisting of a pseudolite system, a vehicle wheel sensor system, a celestial sensor, and a geo-referencing system.

8. The system of claim 7 wherein the means for providing PNT data is Pseudolite IS-GPS-250-A.

9. The system of claim 4 wherein the connection between the receiver and the means for providing PNT data is wired through the simulator.

10. The system of claim 3 further comprising a first antenna and a second antenna.

11. The system of claim 1 wherein the receiver is a GPS receiver that processes the simulated GNSS signal as a normal GNSS signal.

12. The system of claim 1 wherein the means for providing PNT data comprises a transducer.

13. The system of claim 1 wherein the means for providing PNT data is selected from the group consisting of visual decoding of camera images, time-difference-of-arrival, and frequency-difference-of-arrival.

14. A system comprising:
  a receiver configured to operate in conjunction with a global navigation satellite system (GNSS), the receiver capable of processing a signal received from the GNSS and outputting an indication of the position or the current time of the receiver based on the signal;
  a means for providing position, navigation and time (PNT) data indicative of at least one of a position or a current time, the PNT data generated independent of the GNSS, the means being selected from the group consisting of an inertial measurement unit, inertial navigation system, gyros, magnetometers, accelerometers, a celestial sensor, a pseudolite system, a vehicle wheel sensor system, a geo-referencing system, a visual decoding of camera images system, a time-difference-of-arrival system, and a frequency-difference-of-arrival system; and
  a simulator configured to perform the following acts in response to receiving the PNT data from the means for providing PNT data:
    generating a simulated GNSS signal, the simulated GNSS signal conforming to a signal of the GNSS that the receiver is capable of processing; and,
    outputting the simulated GNSS signal to the receiver, wherein responsive to receiving the simulated GNSS signal, the receiver outputs an indication of the position or the current time indicated in the PNT data.

15. The system of claim 14 wherein the GNSS is selected from the group consisting of GPS, Glonass, BeiDou, QZSS, and Galileo.

16. The system of claim 15 wherein the means for providing PNT data comprises a transducer and an oscillator.

17. A device to retrofit a global navigation satellite system (GNSS) receiver to provide alternative sources of position, navigation, and timing (PNT) data, the device comprising:
   a simulator configured to receive and transcode PNT data,
   a first GNSS receiver configured to receive first GNSS signals and to output first PNT data to the simulator,
   a means for generating second PNT data independent of the first GNSS signals and to output second PNT data to the simulator,
   wherein the simulator is configured to transcode the first PNT data and/or second PNT data into second GNSS signals.

18. The device of claim 17 wherein the means for generating second PNT data comprises an oscillator and a transducer.

19. The device of claim 17 wherein the means for generating second PNT data is selected from the group consisting of inertial measurement unit, inertial navigation system, gyros, magnetometers, accelerometers, a celestial sensor, a pseudolite system, a vehicle wheel sensor system, a geo-referencing system, a visual decoding of camera images system, a time-difference-of-arrival system, and a frequency-difference-of-arrival system.

20. The device of claim 17 wherein the means for generating second PNT data comprises a second GNSS receiver.

* * * * *